(No Model.)

R. O. & W. MOORHOUSE.
PAPER STOCK SORTING AND CLEANING MACHINE.

No. 298,108. Patented May 6, 1884.

WITNESSES
Phil C. Dieterich
W. R. Keyworth

INVENTORS:
Rob't O. Moorhouse
Walter Moorhouse
by Lloyd Wiegand Attorney

United States Patent Office.

ROBERT O. MOORHOUSE AND WALTER MOORHOUSE, OF PHILADELPHIA, PA.

PAPER-STOCK SORTING AND CLEANING MACHINE.

SPECIFICATION forming part of Letters Patent No. 298,108, dated May 6, 1884.

Application filed October 12, 1883. (No model.)

*To all whom it may concern:*

Be it known that we, ROBERT O. MOORHOUSE and WALTER MOORHOUSE, both citizens of the United States, residing at Philadelphia, in the county of Philadelphia and State of Pennsylvania, have invented certain new and useful Improvements in Paper-Stock Sorting and Cleaning Machines; and we do hereby declare the following to be a sufficiently full, clear, and exact description thereof to enable others skilled in the art to make and use the said invention.

This invention relates to the sorting of materials used for paper-stock, and has for its object the turning over and loosening of the same and passing them steadily upon a screen before the eyes of the operatives, whose attention being relieved of the labor of spreading, opening, and removing the paper-making materials, are enabled to more quickly and thoroughly sort them.

The nature of this invention consists in an endless traveling screen of wire-cloth supported upon and moved by suitable rollers turned by power, upon which the stock is placed near one end, and a series of rotating vanes, also turned by power, which, by sweeping over the top of the screen, rub the stock upon it and open it, thus spreading it in view of the operatives and letting much of the dirt and grit fall through the screen. The operatives, being stationed along the sides of the screen, between the several vanes, remove objectionable objects that do not pass through the screen, and the desirable stock, being carried to the end, is discharged by having several operatives each taking out a particular kind or color of material, and they are thus very expeditiously sorted.

We will now proceed to particularly describe the said invention, referring in so doing to the drawings annexed, in which—

Figure 2:
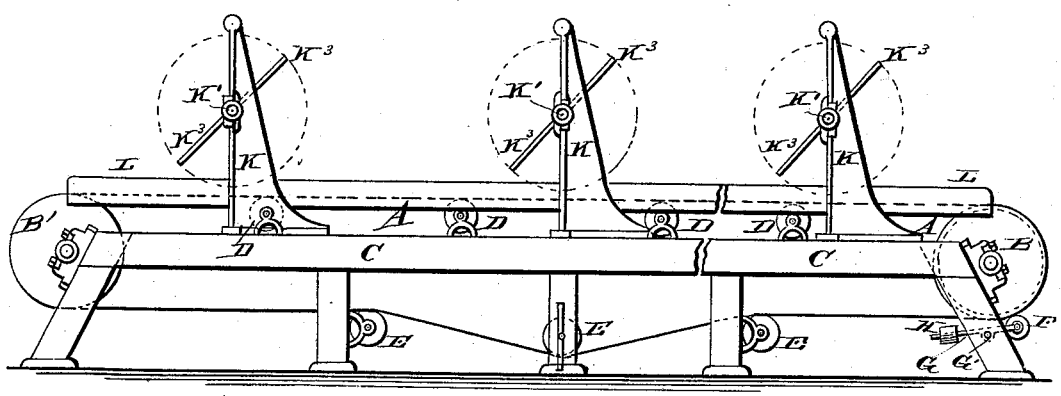
Figure 1:
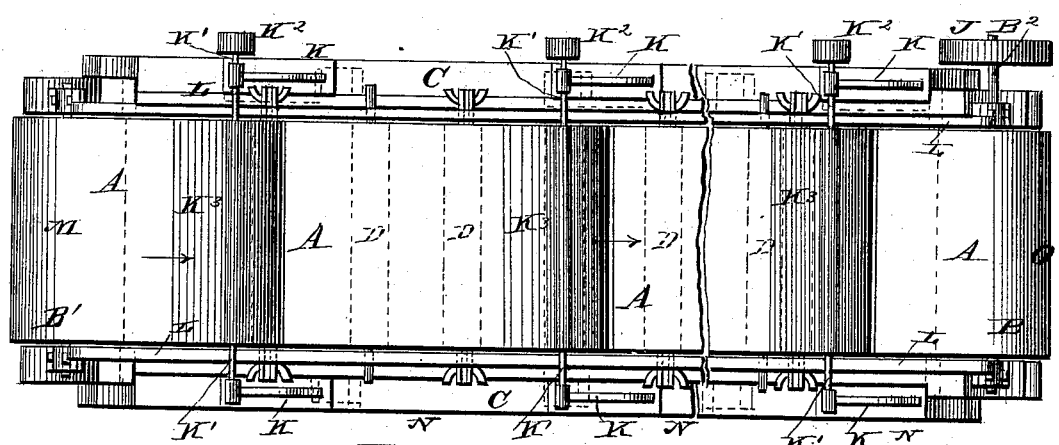
Figure 3:
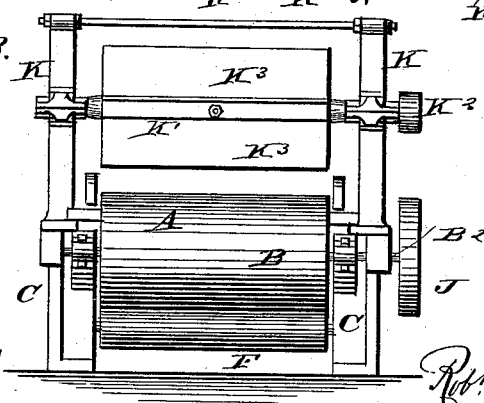

Figure 1 is a top view of the machine; Fig. 2, a front view, and Fig. 3 an end view.

The same letters of reference apply to the same parts in the several figures.

A is an endless apron of wire-cloth, supported by rollers B and B' at the ends of the frame C, and smaller intermediate rollers, D D, upon its upper portion, and rollers E E on the lower portion; a roller, F, supported and turning in bearings formed in the ends of the levers G, pivoted at G' to the frame C, by which the apron A is pressed toward the roller B by the action of weights H on the opposite end of the levers G, so that by applying power by a band to the pulley J on the shaft B² of the roller B the adhesion or friction of the apron A upon the roller B will be sufficient to cause the apron to move in the direction of the arrows in Fig. 1 without subjecting the entire length of the apron A to such severe strain as would be requisite were it strained be tightening the roller B'.

K K are standards or frames secured to the frame C at intervals, and support shafts K', turning in bearings in the standards K by means of pulleys K², and having vanes K³, preferably made of sheet metal, and provided with edges of leather, rubber cloth, or similar yielding material, which are of such dimensions as to sweep the apron A. Strips or rims L L are placed at each side of the apron A, which serve to prevent the stock spreading laterally beyond the reach of the vanes K³ and falling off the apron A.

The operation of the machine is as follows: Power is applied to the pulleys B² and K², the materials are placed on the apron A at the place marked M, and pass, by the motion of the apron A, under the vanes K², are rubbed over the apron, and any grit and sand detached from them falls through the apron, and the stock, by the rubbing, becoming opened and spread out before operators stationed at N N N between the reels K³, is readily sorted by the operators removing such as is not desired to pass through the machine, and the remaining acceptable materials pass off at the end of the apron A, at the point O, ready for use as paper-stock.

In the drawings only three reels or sets of revolving vanes are shown; but in practice a larger number are used, and a greater number of operatives than three are employed, the machine being much longer than shown, as is implied by the break in Fig. 2, the increased length of machine involving a mere duplication of the parts shown.

Having described this invention and the mode of operating the same, what we claim is—

1. In a machine for sorting and cleaning paper-stock, the combination of a progressively-moving screening-apron with a series of revolving vanes, arranged to operate substantially as set forth.

2. In a machine for sorting and cleaning paper-stock, the combination of an endless screening-apron with a driving-roller and a second roller pressed toward said driving-roller upon the apron, as and for the purpose set forth.

3. In a machine for sorting and cleaning paper-stock, the combination of revolving vanes having leather or other equivalent clothing upon the edges thereof, with a progressively-moving endless screening-apron, arranged to operate substantially as and for the purpose set forth.

R. O. MOORHOUSE.
WALTER MOORHOUSE.

Witnesses:
LOEVER STACKHOUSE,
G. STROBEL SULLIVAN.